US006999582B1

(12) United States Patent
Popovic et al.

(10) Patent No.: US 6,999,582 B1
(45) Date of Patent: Feb. 14, 2006

(54) ECHO CANCELLING/SUPPRESSION FOR HANDSETS

(75) Inventors: Mirjana Popovic, Ottawa (CA); Dieter Schulz, Kanata (CA)

(73) Assignee: Zarlink Semiconductor Inc., Ottawa (CA)

( * ) Notice: Subject to any disclaimer, the term of this patent is extended or adjusted under 35 U.S.C. 154(b) by 0 days.

(21) Appl. No.: 09/488,141

(22) Filed: Jan. 20, 2000

(30) Foreign Application Priority Data

Mar. 26, 1999 (GB) ..................... 9907102

(51) Int. Cl.
*H04M 9/08* (2006.01)
(52) U.S. Cl. .................... 379/406.01; 379/406.02; 379/406.03; 379/406.05; 379/406.06; 379/406.08
(58) Field of Classification Search ......... 379/406.01–406.16; 712/224
See application file for complete search history.

(56) References Cited

U.S. PATENT DOCUMENTS 4,139,899 A * 2/1979 Tulpule et al.
4,623,980 A * 11/1986 Vary
5,072,418 A * 12/1991 Boutaud et al. ............ 708/207
5,668,794 A * 9/1997 McCaslin et al.
5,729,725 A * 3/1998 Kato et al.
5,859,914 A     1/1999 Ono et al.
5,887,059 A     3/1999 Xie et al.
6,128,725 A * 10/2000 Leach

FOREIGN PATENT DOCUMENTS

WO    WO 99/22460    5/1999

* cited by examiner

*Primary Examiner*—Sinh Tran
*Assistant Examiner*—Ramnandan Singh
(74) *Attorney, Agent, or Firm*—Beyer Weaver & Thomas, LLP

(57) ABSTRACT

A method for suppressing echo signals generated in a communication path such as acoustic coupling between a speaker and a microphone in a telephone device handset includes the steps of monitoring signals supplied to the communication path to determine an attribute thereof and masking signals received from the communication path as a function of the determined attribute of the monitored signals thereby to suppress echo.

14 Claims, 4 Drawing Sheets

ECHO CANCELLING/SUPPRESSION FOR HANDSETS

FIELD OF THE INVENTION

The present invention relates generally to communications and in particular to an echo suppressor and method for suppressing echoes in a communication path.

BACKGROUND OF THE INVENTION

Acoustic coupling in telephone device handsets is common and occurs when signals broadcast by the speaker of a telephone device handset are coupled to the microphone of the same telephone device handset. This acoustic coupling results in echo signals being applied to the network over which the communication channel is established. The acoustic suppression of signals broadcast by the handset speaker before they are picked up by the handset microphone is variable and depends on a number of factors, such as the pressure exerted on the user's ear by the handset speaker and how well the handset speaker seals the ear. The loss in power of these signals as a result of acoustic suppression can vary from about −50 db to as low as −24 db when the telephone device handset is placed on a hard surface. If the delay in the network is short, such as for example 30 ms, the normal acoustic suppression of signals broadcast by the handset speaker is generally sufficient to inhibit voice quality from being noticeably degraded by the echo signals picked up by the handset microphone. However, if the delay in the network is significant, echo signals applied to the network due to acoustic coupling will noticeably degrade voice quality over the communication channel. As such, suppressing echo signals resulting from acoustic coupling in telephone device handsets is important.

Echo cancelers in telephone device handsets have been considered. A typical echo canceler attempts to model the transfer function of the echo signal path using a linear algorithm such as a Least-Mean-Squared (LMS) algorithm. The estimated echo signals generated by the echo canceler are subtracted from the echo signals picked up by the handset microphone. Differences between the estimated echo signals and the actual echo signals result in error signals, which are fed back to the echo canceler. Unfortunately, since the algorithm executed by the echo canceler is linear, the echo canceler cannot deal with non-linear effects and can only converge to a transfer function which approximates the echo signals. As a result, residual echo error signals are applied to the network.

It is therefore an object of the present invention to provide a novel echo suppressor and method for suppressing echoes in a communication path.

SUMMARY OF THE INVENTION

According to one aspect of the present invention there is provided a method for suppressing echo signals generated in a communication path comprising the steps of:
    monitoring signals supplied to said communication path to determine an attribute thereof; and
    masking signals received from said communication path as a function of the determined attribute of said monitored signals.

In a preferred embodiment, the attribute is the power level of the monitored signals. During the monitoring step, power level calculations are performed to determine the power level of the monitored signals. This is achieved by generating an envelope following the power level of the monitored signals. The envelope is generated by an infinite impulse response (IIR) lowpass filter. The IIR lowpass filter generates the envelope by solving the equation:

$$AbsY = (1-alpha)*AbsY + alpha*AbsY_0$$

where alpha is a parameter of the IIR filter, Y is the power level of the current monitored signal, $Y_0$ is the power level of the previously monitored signal and AbsY and $AbsY_0$ are the absolute values of the power levels Y and $Y_0$ respectively.

An echo signal value is then calculated by solving the equation:

$$Echo = AbsY/10^{(A/20)}$$

where A is the minimum attenuation of echo signals in the communication path. The calculated echo signal value is used to select a mask to be combined with digitized signals received from the communication path.

Preferably, the mask is a string of n-bits where n is a function of the echo signal value and wherein at least the most significant bits of the string have a zero value. In one embodiment, the bits of the mask are all zeros to basically achieve total echo suppression. In an alternative embodiment, the mask is leaky and at least the least significant bit of the mask has a one value.

According to another aspect of the present there is provided an echo suppressor to suppress echo signals generated in a communication path comprising:
    a power level calculator determining the power level of signals supplied to said communication path; and
    a mask generator responsive to said power level calculator and generating masks, said masks being generated as a function of the determined power level and being applied to the signals received from said communication path thereby to suppress echo signals received from said communication path.

According to still yet another aspect of the present invention there is provided in a telephone device including a handset having a speaker to broadcast incoming signals and a microphone to receive outgoing signals, an echo suppressor to suppress echo signals picked up by the microphone as a result of acoustic coupling between said speaker and microphone comprising:
    a power level calculator determining the power level of incoming signals to be broadcast by said speaker; and
    a mask generator responsive to said power level calculator and generating masks, said masks being generated as a function of the determined power and being applied to said outgoing signals thereby to suppress echo signals.

According to another aspect of the present invention there is provided an echo suppressor to suppress echo signals generated in a communication path comprising:
    an echo canceler in parallel with said communication path, said echo canceler having a transfer function approximating that of said communication path and generating estimated echo signals in response to signals supplied to said communication path, said echo canceler subtracting said estimated echo signals from signals received from said communication path to generate residual echo error signals; and
    a processor receiving said estimated echo signals and said residual echo error signals, said processor including a power level calculator to determine the power level of the estimated echo signals; and a mask generator responsive to the power level calculator and generating masks, said masks being generated as a function of the determined power level and being applied to said residual echo error signals thereby to suppress the same.

The present invention provides advantages in that since echo signals are adaptively masked by the echo suppressor, echo suppression is achieved while maintaining voice quality.

BRIEF DESCRIPTION OF THE DRAWINGS

Embodiments of the present invention will now be described more fully with reference to the accompanying drawings in which.

DETAILED DESCRIPTION OF THE PREFERRED EMBODIMENT

Figure 1:
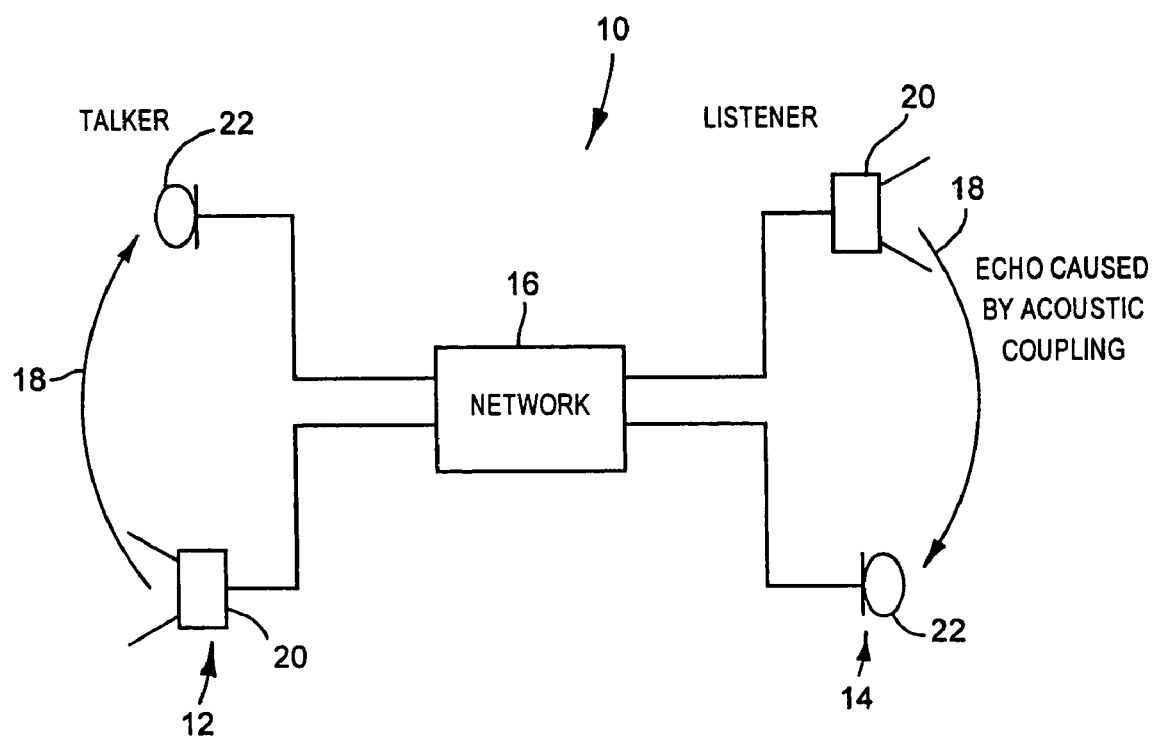
FIG. 1 is a schematic diagram of a communication channel established between a pair of telephone devices over a network showing acoustic coupling in one of the telephone devices.

Turning now to FIG. 1, a communication channel established between a pair of telephone devices 12 and 14 over a network 16 is shown and is generally indicated to by reference numeral 10. As can be seen, when a communication channel is established between the telephone devices 12 and 14, acoustic signals 18 broadcast by the handset speaker 20 of receiving telephone device 14 are acoustically coupled to the handset microphone 22 of the telephone device 14. The echo signals picked up by the handset microphone 22 as a result of the acoustic coupling cause echoes in the network 16, which degrade voice quality.

If the delay in the network 16 is long, such as for example 150 ms, which may be caused by voice packetization and local area network (LAN) propagation delays, echoes in the network 16 as a result of acoustic coupling become audible thereby detracting from voice quality.

Figure 2:
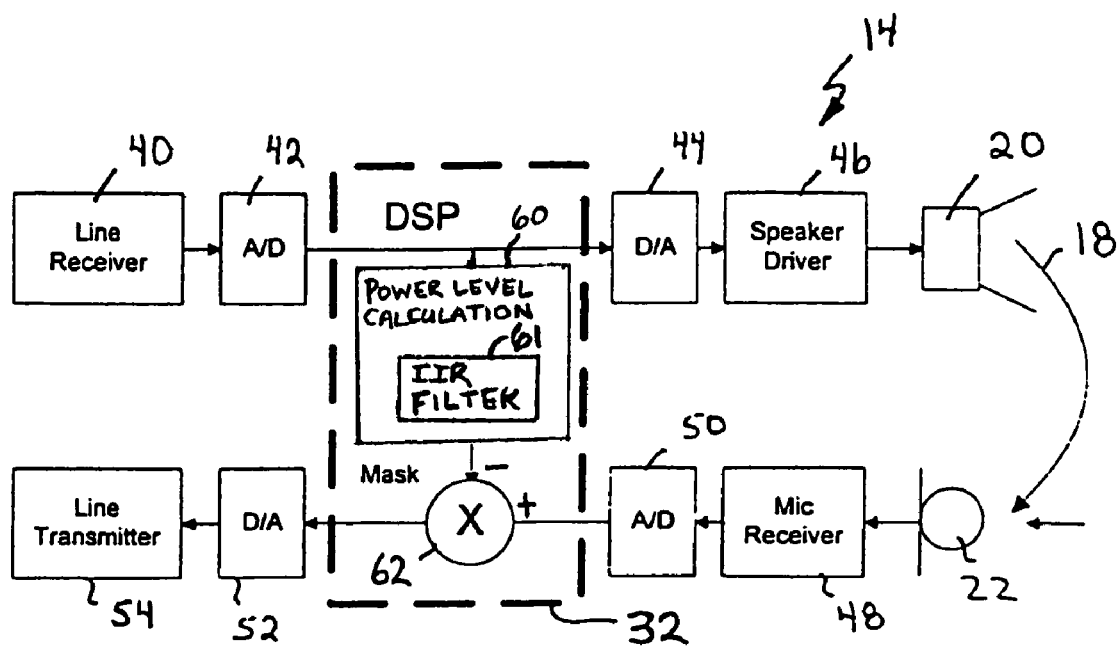
FIG. 2 is a schematic diagram of a telephone device including an echo suppressor in accordance with the present invention.

To suppress adaptively echo signals picked up by the handset microphone 22 as a result of acoustic coupling, an echo suppressor 32 in accordance with the present invention is provided in each of the telephone devices 12 and 14 respectively. FIG. 2 better illustrates telephone device 14. As can be seen, telephone device 14 includes a line receiver 40 coupled between the network 16 and an analog to digital converter 42. Analog to digital converter 42 provides digital output to the echo suppressor 32 and to a digital to analog converter 44. The digital to analog converter 44 conveys its analog output to a speaker driver 46, which amplifies the analog signals before they are broadcast by the handset speaker 20.

Coupled to the handset microphone 22 is a microphone receiver 48, which provides output to an analog to digital converter 50. Analog to digital converter 50 provides digital output to the echo suppressor 32. Echo suppressor 32 in turn supplies output to a digital to analog converter 52 that is coupled to the network 16 via a line transmitter 54.

As can be seen, echo suppressor 32 couples the handset speaker 20 and the handset microphone 22 of the telephone device 14. The echo suppressor 32 adaptively masks echo signals picked up by the handset microphone 22 to inhibit echo in the network 16. The adaptive masking performed by the echo suppressor 32 is based on the power level of signals to be broadcast by the handset speaker 20. This is due to the fact that typically, the larger the signals broadcast by the handset speaker 20, the larger the echo signals picked up by the handset microphone 22 as a result of acoustic coupling will be.

In the present embodiment, the echo suppressor 32 is embodied in a digital signal processor executing an echo suppression algorithm. The echo suppression algorithm performs a power level calculation 60 to determine the power level of signals received by the telephone device 14 to be broadcast by the handset speaker 20 and uses the determined power level to generate masks. The masks are subtracted from signals received by the handset microphone 22 via a multiplier 62 to mask echo signals picked up by the handset microphone 22.

Appendix A shows psuedo-code representing the echo suppression algorithm executed by the echo suppressor 32. The echo suppression algorithm, in response to signals to be broadcast by the handset speaker 20, invokes a power level calculation routine (see Appendix B). During execution of this routine, an envelope following the power level of signals to be broadcast by the handset speaker is generated using an infinite impulse response (IIR) lowpass filter 61. The IIR filter 61 generates the envelope by estimating the long-range average of the absolute value of the signal to be broadcast and is of the form:

$$\text{AbsY} = (1-\text{alpha}) * \text{AbsY} + \text{alpha} * \text{AbsY}_0 \qquad (1)$$

Figure 3:
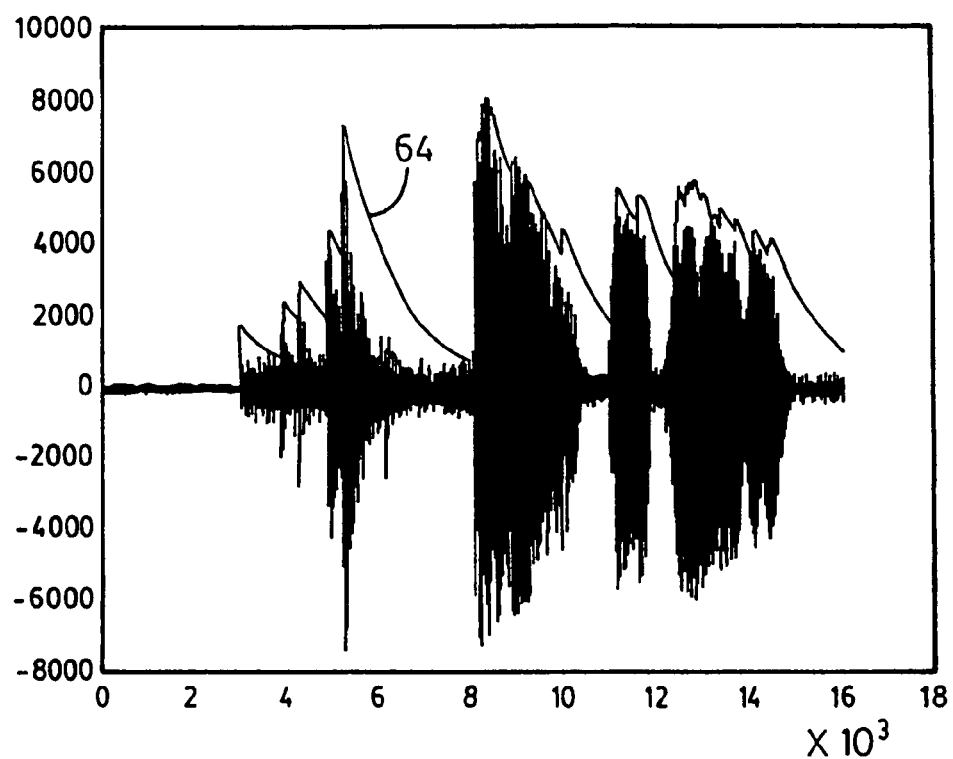
FIG. 3 is a graph showing an envelope calculated by the echo suppressor of FIG. 2 following the power level of a signal to be broadcast by a telephone device handset speaker.

Alpha is an IIR filter parameter and is chosen to provide a fast attack time and a slow decay time for the IIR filter 61. In the present embodiment, two different values for alpha are used, namely alpha_fast and alpha_slow depending on the power level of the signal to be broadcast by the handset speaker 20. FIG. 3 shows an example of an envelope 64 generated by the echo suppressor 32 in response to a signal to be broadcast by the handset speaker where alpha_fast=1 and alpha_slow=$2^{-2}$. As will be appreciated, by choosing these values for alpha, the echo suppressor generates an envelope that reacts fast to signals to be broadcast by the handset speaker 20. The slow decay time on the other hand compensates for small signal delays and reduces the switching effect when the signals fade. Y is the power level of the current monitored signal and $Y_0$ is the power level of the previously monitored signal. AbsY and $\text{AbsY}_0$ are the absolute values of power levels Y and $Y_0$ respectively.

As the envelope is generated, the echo suppressor 32 invokes a mask selection routine to calculate the maximum expected value of the echo signal based on the envelope. As stated earlier, the echo signal received by the handset microphone 22 is an attenuated copy of the signal broadcast by the handset speaker 20. The maximum expected value of the echo signal is calculated by solving the equation:

$$\text{Echo} = \text{AbsY}/10^{(A/20)} \qquad (2)$$

where A is the minimum attenuation or acoustic suppression of echo signals.

Thus, for example in a case where signals broadcast by the handset speaker 20 undergo a minimum attenuation of −24 dB before being picked up as echo signals by the handset microphone 22, the maximum expected value of the echo signal according to equation (2) is equal to AbsY/15.8489.

After the maximum expected value of the echo signal has been calculated, the mask selection routine selects the mask to be combined with the echo signal in accordance with the routine illustrated in Appendix B. In the present embodiment, the mask combined with the echo signal takes the form of a string of zeros n-bits long, where n is a function of the echo signal value determined at equation (2). The maximum value for n is determined by the maximum output value of the analog to digital converter 50, which in the present example is 8192. Solving equation (2) using this value for AbsY yields 517 which in binary format is 1000000100. As a result, a mask having ten zeros (i.e. n=10) is required to mask this binary value.

For example, if the power level of the signal to be broadcast by the handset speaker 20 is equal to 1379 after solving equation (1) to determine AbsY, by solving equation (2) the expected echo signal level equals 87 (assuming A=−24 dB) which in binary format is 1010111. In accordance with the mask selection routine, a mask having seven zeros is chosen and is combined with the signals received by the handset microphone 22 and digitized by the analog to digital converter 50.

Figure 4:
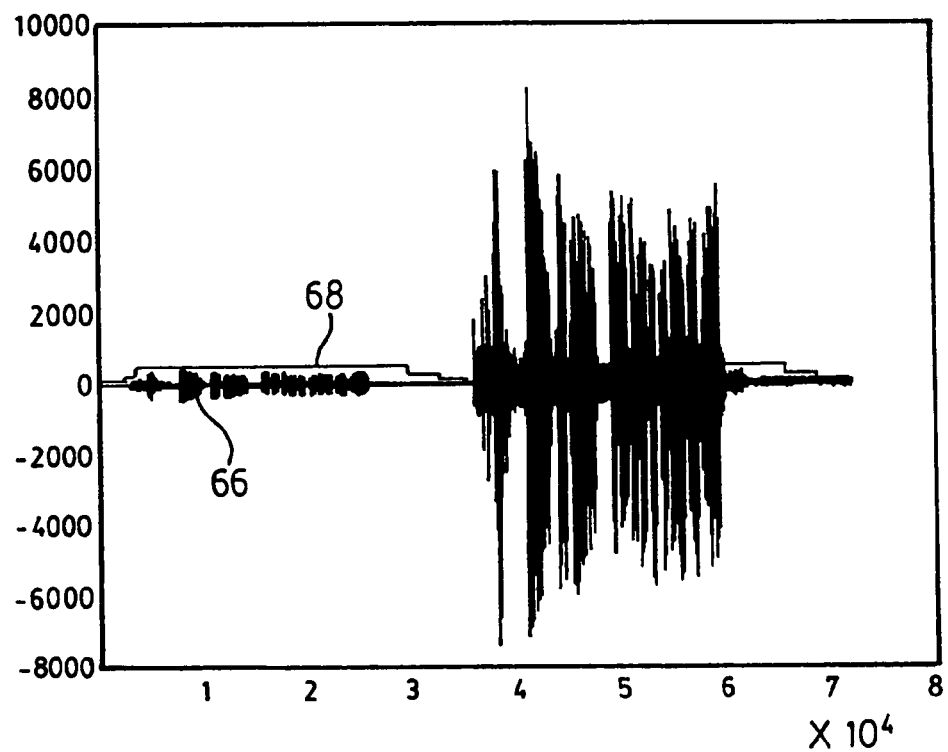
FIG. 4 is a graph showing an echo signal and the mask generated by the echo suppressor of FIG. 2 to "cover" the echo signal picked up by a telephone device microphone.

FIG. 4 shows an echo signal 66 in a telephone device having a minimum acoustic attenuation or suppression equal to −24 dB together with the mask 68 selected by the echo suppressor 32. In the first half of the graph, it can be seen that the mask 68 completely covers the echo signal. In the second half of the graph, voice signals picked up by the handset microphone 22 superimposed on the echo signal are shown. As will be appreciated, the mask is orders of magnitude smaller than the voice signals. As a result, the mask causes only a minimum loss of speech quality.

As will be appreciated, the echo suppressor 32, by selecting masks having the appropriate number of zeros, adaptively masks echo signals to achieve basically total echo suppression.

If desired, "leaky" masks can be used to mask echo signals to inhibit noticeable switching, which may occur during total echo suppression in the presence of high background noise. "Leaky" refers to a mask having at least one least significant bit (LSB) with a "one" value. Generally, the number of LSBs having "one" values is chosen depending on the number of bits in the selected mask. For example, if an 8-bit mask is generated the three LSBs of the mask can be leaked (i.e. have "one" values). If a 7-bit mask is generated, the two LSBs of the mask can be leaked. As will be appreciated, by leaking some of the background noise, switching is reduced.

Figure 5:
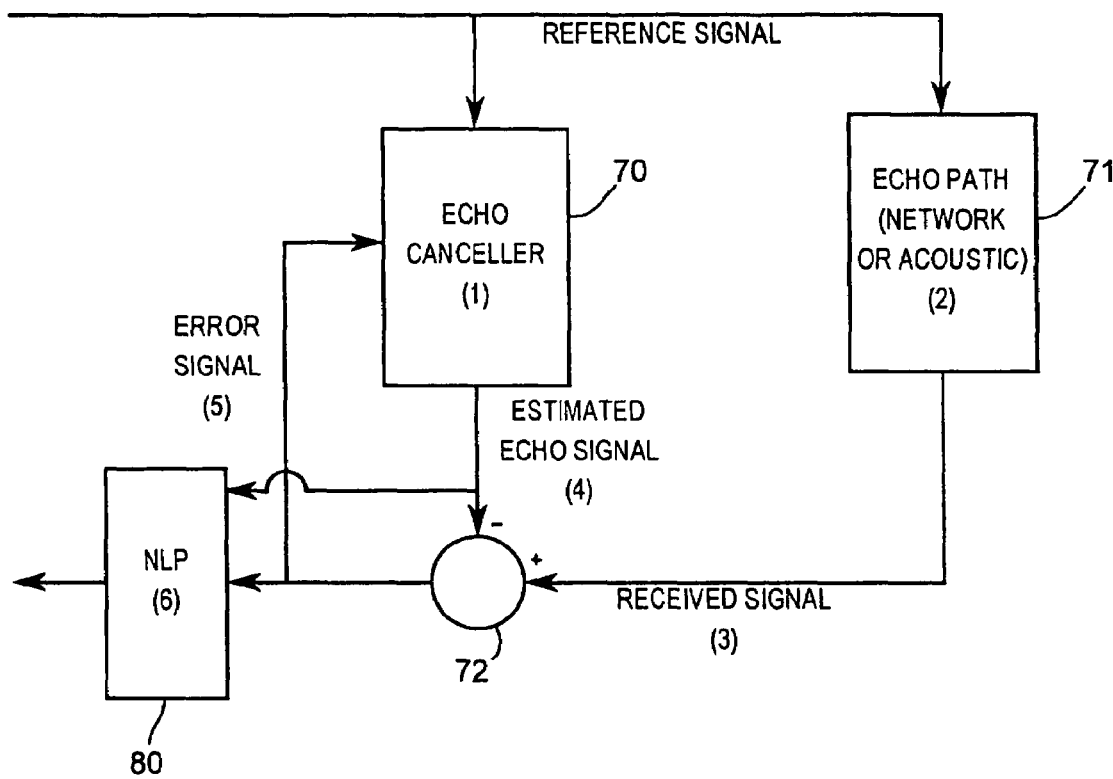
FIG. 5 is a schematic diagram of a conventional echo suppressor and a non-linear processor to suppress residual echo signals in accordance with the present invention.

Turning now to FIG. 5, an alternative embodiment of the present invention is shown. In this embodiment, a conventional echo canceler 70 is in parallel with a communication path 71 in which echo signals are generated. The communication path 71 may be a telephone device handset as described in the previous embodiment. Alternatively, the communication path 71 may be a handsfree telephone, network which causes network reflections or other source of echo signals. The echo canceler 70 attempts to model the transfer function of the echo signal path using a Least-Mean-Squared (LMS) algorithm so that the echo canceler generates estimated echo signals that are the same as the echo signals received from communication path 71. The estimated echo signals are subtracted 72 from the actual echo signals in an attempt to cancel the echo signals. The amount of cancellation is commonly referred to as ERLE. Differences between the estimated echo signals and the actual echo signals result in error signals. The error signals are fed back to the echo canceler 70 so that the echo canceler can attempt to converge to the correct transfer function.

Unfortunately, the LMS algorithm only models linear effects in the echo path and does not deal with non-linear effects caused by for example, clipping, telephone key rattling, and frequency shifts. Therefore, the echo canceler converges to a transfer function that approximates the correct transfer function resulting in non-zero error signals. This causes residual echo signals.

To suppress the residual echo signals, a non-linear processor (NLP) 80 is provided and receives the estimated echo signals output by the echo canceler 70 as well as the residual error signals output by the subtractor 72. The NLP 80 executes an echo suppression algorithm similar to that executed by echo suppressor 32 to determine the power level of the estimated echo signals output by echo canceler 70 and to generate masks based on the determined power level. The masks are combined with the error signals to suppress the residual echo signals.

For example, assuming the echo canceler 70 will achieve an ERLE equal to 18 db, it can be expected that the residual echo signal will be eight times smaller than the estimated echo signal. During execution of the echo suppression algorithm, an envelope equal to 13798 is generated by solving equation (1). The expected echo signal has a value equal to (1379/8)=173 after solving equation (2). The closest power of two mask is 0xFFD00. Assuming it is only necessary to improve the ERLE with 12 db to achieve a total ERLE equal to 30 db, the least significant bits can be leaked yielding a mask equal to 0xFF0F.

Although the echo suppressor 32 is shown as being incorporated in a telephone device to suppress echo signals generated as a result of acoustic coupling in the telephone device handset, those of skill in the art will appreciate that the echo suppressor and non-linear processor may be used to suppress echo signals generated in virtually any communication path in which echo signals are generated.

In addition, although preferred embodiments of the present invention have been described, those of skill in the art will appreciate that variations and modifications may be made without departing from the spirit an scope thereof as defined by the appended claims.

---

Inputs: transmitted_signal(1), received_signal (2)
Output: output_signal going to the network (3)
Start:
Calculate the power of the signal to be broadcast by the handset speaker;
AbsY = (1-alpha)*AbsY + alpha*abs($Y_0$);
Chose the mask that corresponds to the power of the signal to be broadcast
by the handset speaker;
Mask = Mask_select(AbsY);
Output_signal = received_signal AND Mask;
Go to Start;
where:
    transmitted_signal is the signal received by the telephone device to be broadcast by the handset speaker;
    received_signal is the echo signal picked up by the handset microphone and voice signals picked up by the handset microphone;
    alpha is an IIR filter parameter;

-continued

Y is the power level of the received signal or currently monitored signal;
Y₀ is the power level of the transmitted_signal or previously monitored signal; and
Output_signal is the signal output to the network by the telephone device.

---

Power Level Calculation Routine

```
if AbsY > AbsY₀
    AbsY = (1-alpha_slow)*AbsY + alpha_slow * AbsY₀;
else
    AbsY = (1-alpha_fast)*AbsY + alpha_fast * AbsY₀;
end
where:
    AbsY and AbsY₀ are the absolute values of the power levels Y
    and Y₀ respectively
Mask Selection Routine Mask_select:
        Mask = 64512;      % fc00 or 10 zeros (1111110000000000)
        if AbsY < 4063
          Mask = 65024;    % fe00 or 9 zeros
        end
        if AbsY < 2031
          Mask = 65280;    % ff00 or 8 zeros
        end
        if AbsY < 1015
          Mask = 65408;    % ff80 or 7 zeros
        end
        if AbsY < 507
          Mask = 65472;    % ffc0 or 6 zeros
        end
        if AbsY < 253
          Mask = 65504;    % ffe0 or 5 zeros
        end
        if AbsY < 126
          Mask = 65520;    % fff0 or 4 zeros
        end
        if AbsY < 63
          Mask = 65528;    % fff8 or 3 zeros
        end
        if AbsY < 31
          Mask = 65532;    % fffc or 2 zeros
        end
        ifAbsY < 15
          Mask = 65534;    % fffe or 1 zero
        end
```

---

We claim:

1. A method of suppressing echo signals generated in a communication path comprising the steps of:
monitoring signals supplied to said communication path to generate an envelope of the power level of said monitored signals using an infinite impulse response filter, said IIR lowpass filter generating said envelope by solving the equation:

$$AbsY=(1-alpha)*AbsY+alpha*AbsY_0$$

where alpha is a parameter of said IIR filter, Y is the power level of the current monitored signal, $Y_0$ is the power level of a previous monitored signal and AbsY and $AbsY_0$ are the absolute values of the power levels Y and $Y_0$ respectively;
calculating an echo signal level by solving the equation:

$$Echo=AbsY/10^{(A/20)}$$

where A is the minimum attenuation of echo signals in said communication path, said echo signal level being used to select a mask in the form of a string of n-bits, at least the most significant bits having a zero value; and
masking digitized signals received from said communication path with said selected mask.

2. The method of claim 1 wherein all of the bits of said string are zeros.

3. The method of claim 1 wherein at least the least significant bit of said string has a one value.

4. An echo suppressor to suppress echo signals generated in a communication path comprising:
a power level calculator generating an envelope following the power level of signals supplied to said communication path, said power level calculator including an infinite impulse response (IIR) lowpass filter to generate said envelope, wherein said IIR lowpass filter generates said envelope by solving the equation:

$$AbsY=(1-alpha)*AbsY+alpha*AbsY_0$$

where alpha is a parameter of said IIR filter, Y is the power level of the current signal supplied to said communication path, $Y_0$ is the power level of a previous signal supplied to said communication path and AbsY and $AbsY_0$ are the absolute values of power levels Y and $Y_0$ respectively; and
a mask generator responsive to said power level calculator and generating masks, said mask generator calculating an echo signal level by solving the equation:

$$Echo=AbsY/10^{(A/20)}$$

where A is the minimum attenuation of echo signals in said communication path, said echo signal level being used by said mask generator to select each mask said masks being in the form of strings of n-bits, where n is a function of the power level of the signals supplied to said communication path, at least the most significant bits of said strings having zero values, said masks being applied to the digital signals received from said communication path thereby to suppress echo signals received from said communication path.

5. An echo suppressor as defined in claim 4 wherein all of the bits of said strings are zeros.

6. An echo suppressor as defined in claim 4 wherein at least the least significant bit of each string has a one value.

7. A method of suppressing echo signals generated in a communication path comprising the steps of:
monitoring signals supplied to said communication path to determine the power level of said monitored signals by solving the equation:

$$Echo=AbsY/10^{(A/20)}$$

where Y is the power level of a currently monitored signal, AbsY is the absolute value of the power level Y and A is the minimum attenuation of echo signals in said communication path, said echo signal level being used to select a mask to be combined with digitized signals received from said communication path;
generating an estimated echo signal and determining the power level thereof;
subtracting the estimated echo signal from a signal received from said communication path to yield a difference signal; and
masking said difference signal as a function of the determined power level of said monitored signals.

8. The method of claim 7 wherein during said masking a string of n bits is applied to said difference signal, where n is a function of the echo signal level, at least the most significant bits of said string having a zero value.

9. A method of suppressing echo signals generated in a communication path comprising the steps of:

monitoring signals supplied to said communication path;

generating an envelope of the power level of said signals with an infinite impulse response (IIR) lowpass filter by solving the equation:

$$AbsY=(1-alpha)*AbsY+alpha*AbsY_0$$

where alpha is a parameter of said IIR lowpass filter, Y is the power level of the current monitored signal, $Y_0$ is the power level of a previous monitored signal and AbsY and $AbsY_0$ are the absolute values of power levels Y and $Y_0$ respectively;

performing power calculations to determine the power level of said signals and then to determine an echo signal level by solving the equation:

$$Echo=AbsY/10^{(A/20)}$$

where A is the minimum attenuation of echo signals in said communication path; and masking digitized signals received from said communication path by using said echo signal level to select a mask to be combined with said digitized signals, said mask being a string of n-bits, where n is a function of the echo signal level, at least the most significant bits of said string having a zero value.

10. The method of claim 9 wherein all of the bits of said string are zeros.

11. The method of claim 9 wherein at least the least significant bits of said string has a one value.

12. An echo suppressor to suppress echo signals generated in a communication path comprising:

a power level calculator determining the power level of signals supplied to said communication path, said power level calculator including an infinite impulse response (IIR) lowpass filter to generate an envelope following the power level of said signals supplied to said communication path by solving the equation:

$$AbsY=(1-alpha)*AbsY+alpha*AbsY_0$$

where alpha is a parameter of said IIR lowpass filter, Y is the power level of current signals supplied to said communication path, $Y_0$ is the power level of previous signals supplied to said communication path and AbsY and $AbsY_0$ are the absolute values of the power levels Y and $Y_0$ respectively; and a mask generator responsive to said power level calculator and generating masks, said mask generator calculating an echo signal level by solving the equation:

$$Echo=AbsY/10^{(A/20)}$$

where A is the minimum attenuation of echo signals in said communication path, said echo signal level being used by said mask generator to select masks to be combined with digitized signals received from said communication path thereby to suppress echo signals received from said communication path, said masks being in the form of strings of n-bits, where n is a function of the echo signal level, at least the most significant bits of said strings having zero values.

13. An echo suppressor as defined in claim 12 wherein all of the bits of said strings have zero values.

14. An echo suppressor as defined in claim 12 wherein at least the least significant bit of each string has a one value.

* * * * *